(12) United States Patent
Zhang et al.

(10) Patent No.: US 9,523,888 B2
(45) Date of Patent: Dec. 20, 2016

(54) LIQUID CRYSTAL DISPLAY SUBSTRATE, LIQUID CRYSTAL DISPLAY PANEL AND LIQUID CRYSTAL DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Honglin Zhang, Beijing (CN); Dan Wang, Beijing (CN); Xibin Shao, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 717 days.

(21) Appl. No.: 13/995,653

(22) PCT Filed: Mar. 14, 2013

(86) PCT No.: PCT/CN2013/072640
§ 371 (c)(1),
(2) Date: Jun. 19, 2013

(87) PCT Pub. No.: WO2013/135186
PCT Pub. Date: Sep. 19, 2013

(65) Prior Publication Data
US 2015/0192808 A1    Jul. 9, 2015

(30) Foreign Application Priority Data
Mar. 15, 2012 (CN) .................... 2012 2 0098860 U

(51) Int. Cl.
G02F 1/1333    (2006.01)
G02F 1/1337    (2006.01)
(Continued)

(52) U.S. Cl.
CPC ........... *G02F 1/1337* (2013.01); *G02F 1/1368* (2013.01); *G02F 1/133512* (2013.01);
(Continued)

(58) Field of Classification Search
CPC  G02F 1/1333; G02F 1/133512; G02F 1/1337; G02F 1/1368
(Continued)

(56) References Cited

U.S. PATENT DOCUMENTS 6,362,865 B2 * 3/2002  Yoshida ................... 349/122
7,612,860 B2 * 11/2009  Kim ................. G02F 1/133514
349/106
(Continued)

FOREIGN PATENT DOCUMENTS

CN    1885115 A    12/2006
CN    1904699 A    1/2007
(Continued)

OTHER PUBLICATIONS

International Preliminary Report on Patentability Appln. No. PCT/CN2013/072640; Dated Sep. 16, 2014.
(Continued)

*Primary Examiner* — Lucy Chien
(74) *Attorney, Agent, or Firm* — Ladas & Parry LLP

(57) ABSTRACT

According to the present disclosure, there are provided a liquid crystal display substrate, a liquid crystal display panel and a liquid crystal display device. The liquid crystal display substrate comprises: a base substrate; a planarizing layer disposed on the base substrate; and a liquid crystal aligning layer disposed on the planarizing layer. As regards the liquid crystal display substrate, in a place in the planarizing layer that is close to its edge, there is provided a recess.

17 Claims, 3 Drawing Sheets

(51) Int. Cl.
*G02F 1/1335* (2006.01)
*G02F 1/1368* (2006.01)
(52) U.S. Cl.
CPC ............... *G02F 1/133514* (2013.01); *G02F 2001/133357* (2013.01); *G02F 2001/133388* (2013.01)
(58) Field of Classification Search
USPC .................................................. 349/122, 123
See application file for complete search history.

(56) References Cited

U.S. PATENT DOCUMENTS

2005/0078248 A1\* 4/2005 Ota ..................... G02F 1/13378
349/123
2007/0091247 A1 4/2007 Onda

FOREIGN PATENT DOCUMENTS

| CN | 1952761 A | 4/2007 |
| CN | 102402070 A | 4/2012 |
| CN | 102402071 A | 4/2012 |
| CN | 202548486 U | 11/2012 |

OTHER PUBLICATIONS

International Search Report Issued Jun. 27, 2013 Appln. No. PCT/CN2013/072640.

\* cited by examiner

LIQUID CRYSTAL DISPLAY SUBSTRATE, LIQUID CRYSTAL DISPLAY PANEL AND LIQUID CRYSTAL DISPLAY DEVICE

FIELD OF THE INVENTION

The present disclosure relates to a liquid crystal display substrate, a liquid crystal display panel and a liquid crystal display device adopting the liquid crystal display panel.

BACKGROUND

Liquid crystal display devices are such flat panel display devices that become increasingly popular at present, and for example, Thin Film Transistor-Liquid Crystal display is one of them. A liquid crystal panel is one of main components in a liquid crystal display device. The liquid crystal panel is formed by cell-assembling of a color filter substrate and an array substrate, between which, there is formed a liquid crystal cell within which a liquid crystal material is filled. As shown in FIG. 1, an effective display area 4 and a peripheral area 5 are included in the liquid crystal panel. Generally, in the color filter substrate, there are included a first base substrate 1 and multilayer structures, namely, a black matrix 12, a color filter layer 13, a flat protective layer 14 and so on that are provided on the first base substrate 1; and in the array substrate, there are included a second base substrate 2 and multilayer structures, namely, a TFT switch element and an electrode line and a scan line that correspond to it, an insulating layer 22 and so on that are provided on the second base substrate. In order to allow liquid crystal molecules to arrange in a specific direction when they are driven by an external voltage, liquid crystal aligning layers are usually provided on inner sides of the color filter substrate and the array substrate, respectively. Namely, a first liquid crystal aligning layer 15 is provided on the protective layer 14 of the color filter substrate, and a second liquid crystal aligning layer 23 is provided on the insulating layer 22 of the array substrate. Furthermore, in a gap between edges of the color filter substrate and the array substrate, in order that the liquid crystal material is fixed and sealed in the liquid crystal panel, it is also necessary that a sealant 3 be coated in the peripheral area 5 of the liquid crystal panel and solidified. An initial arrangement state of liquid crystal molecules is controlled by the aligning layers of the array substrate and the color filter substrate of the liquid crystal cell.

In prior art, the first liquid crystal aligning layer 15 and the second liquid crystal aligning layer 23 are produced on the color filter substrate and the array substrate by an inkjet process, respectively, and polyimide (briefly called as PI) is used for manufacture of the first liquid crystal aligning layer 15 and the second liquid crystal aligning layer 23. In the inkjet process, a polyimide liquid is firstly coated on a substrate by an inkjet manner, and a liquid crystal aligning layer with a uniform thickness can be obtained, as long as the polyimide liquid that has been coated on the substrate is subjected to free diffusion and heat curing for a certain time. However, in view of liquid surface tension of the polyimide liquid and limitation of liquid viscosity, there may be such a case that a non-uniform area is present at an edge of the finally obtained liquid crystal aligning layer. FIG. 2 is a partially enlarged view, in the peripheral area 5, of the first liquid crystal aligning layer 15 (or the second liquid crystal aligning layer 23) that is manufactured by using an existing technology. As shown by a dashed-line box in the figure, it can be seen clearly that an area, the thickness of which is non-uniform, is present at an edge of the liquid crystal aligning layer. The non-uniform area of the aligning layer will give rise to a disorder of the control on liquid crystals in the liquid crystal cell, so as to cause abnormality in display of the liquid crystal display device. In prior art, in order that this circumstance is escaped from occurring, and normal display of the effective display area 4 may be guaranteed, the following means is usually adopted: areas, the thickness of which is non-uniform, of the first liquid crystal aligning layer 15 and the second liquid crystal aligning layer 23 are made to exist outside the effective display area 4 in isolation. However, this means also results in the fact that a wider peripheral area is inevitably present in the liquid crystal display panel concurrently. For example, in the existing technology in FIG. 2, it is usually necessary that the distance between an outer edge of the liquid crystal aligning layer and the effective display area 4 reach 4.5 mm, leading to inability to minimize the design size for a portion of the display panel surrounding the effective display area.

SUMMARY

An object of the present disclosure is to provide a color filter substrate, an array substrate, a liquid crystal display panel and a liquid crystal display device, which are capable of eliminating a non-uniform area of a liquid crystal aligning layer so as to enable design size for the periphery of the liquid crystal display panel to be minimized.

According to an embodiment of the present disclosure, there is provided a liquid crystal display substrate, comprising: a base substrate; a planarizing layer disposed on the base substrate; and a liquid crystal aligning layer disposed on the planarizing layer, wherein the planarizing layer is provided with a recess therein at a place close to its edge.

In an example, the liquid crystal aligning layer terminates within the recess.

In an example, the liquid crystal display substrate includes an effective display area and a peripheral area surrounding the effective display area, and the distance between one side of the recess close to the effective display area and the effective display area is smaller than or equal to 2 mm.

In an example, the recess extends along an edge of the base substrate.

In an example, the thickness of a portion of the liquid crystal aligning layer within the recess is larger than the thickness of other portion of the liquid crystal aligning layer.

In an example, the depth of the recess is in the range of 6000 Å-8000 Å, and its width is in the range of 1 mm-1.5 mm.

In an example, the thickness of the liquid crystal aligning layer within the recess is in the range of 3000 Å-4000 Å.

In an example, the liquid crystal display substrate is a color filter substrate, and the color filter substrate further comprises a black matrix and a color filter layer that are disposed between the planarizing layer and the substrate.

In an example, the liquid crystal display substrate is an array substrate, and the array substrate further comprises a thin film transistor (TFT) switch element and an electrode line and a scan line corresponding to it, which are disposed between the planarizing layer and the substrate.

According to another embodiment of the present disclosure, there is provided a liquid crystal display panel, comprising a first substrate and a second substrate that are cell-assembled to each other and a liquid crystal layer placed between the first substrate and the second substrate, wherein each of the first substrate and the second substrate includes: a base substrate; a planarizing layer disposed on the base substrate; and a liquid crystal aligning layer disposed on the planarizing layer, wherein the planarizing layer is provided with a recess therein at a place close to its edge.

According to still another embodiment of the present disclosure, there is provided a liquid crystal display device that comprises a liquid crystal display panel, the liquid crystal display panel including a first substrate and a second substrate that are cell-assembled to each other and a liquid crystal layer that is placed between the first substrate and the second substrate, wherein each of the first substrate and the second substrate includes: a base substrate; a planarizing layer disposed on the base substrate; and a liquid crystal aligning layer disposed on the planarizing layer, wherein the planarizing layer is provided with a recess therein at a place close to its edge.

Further, the first substrate and the second substrate in the liquid crystal display panel or the liquid crystal display device according to the present disclosure may be the color filter substrate and the array substrate according to any embodiment of the invention, respectively.

The liquid crystal display panel according to the present disclosure utilizes characteristics of polyimide liquids for manufacturing liquid crystal aligning layers to provide recesses in peripheries of the liquid crystal aligning layers for the color filter substrate and the array substrate in the peripheral area of the liquid crystal display panel, so that the polyimide liquids flow into the recesses. The surface tension is released by the recesses, and such a shortcoming that the peripheral area is uneven owing to the influence of surface tension and viscosity during free diffusion of the polyimide liquids in the liquid crystal aligning layers is effectively reduced (or even eliminated). Thus, the extent of uneven thickness of the liquid crystal aligning layers in the peripheral area can be reduced, and thereby minimization of design size for the periphery of the liquid crystal display panel is realized.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but are not limitative of the invention.

DETAILED DESCRIPTION

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which should be within the scope sought for protection by the invention.

A color filter substrate, which includes a first base substrate, and a black matrix, a color filter layer and a flat protective layer that are disposed on the first base substrate, is provided. The color filter substrate is provided with a first liquid crystal aligning layer thereon, and, in the color filter substrate, the flat protective layer is provided with a first recess therein at a place close to its edge.

An array substrate, which includes a second base substrate, and a TFT switch element and an electrode line and a scan line corresponding to it and an insulating layer that are disposed on the second base substrate, is provided. The array substrate is provided with a second liquid crystal aligning layer thereon, and, in the array substrate, the insulating layer is provided with a second recess therein at a place close to its edge.

The color filter substrate and the array substrate as stated above may be collectively called as a liquid crystal display substrate, and the flat protective layer and the insulating layer as stated each serve to provide planarized surfaces for formation of the liquid crystal aligning layers, and thus can be collectively called as a planarizing layer. Thereby, according to an embodiment of the present disclosure, there may be provided a liquid crystal display substrate, comprising: a base substrate; a planarizing layer disposed on the base substrate; and a liquid crystal aligning layer disposed on the planarizing layer, wherein the planarizing layer is provided with a recess therein at a place close to its edge.

A liquid crystal display panel, which comprises a color filter substrate and an array substrate, is provided. The above-mentioned color filter substrate is used as the color filter substrate, and the above-mentioned array substrate is used as the array substrate.

First Embodiment

Figure 1:
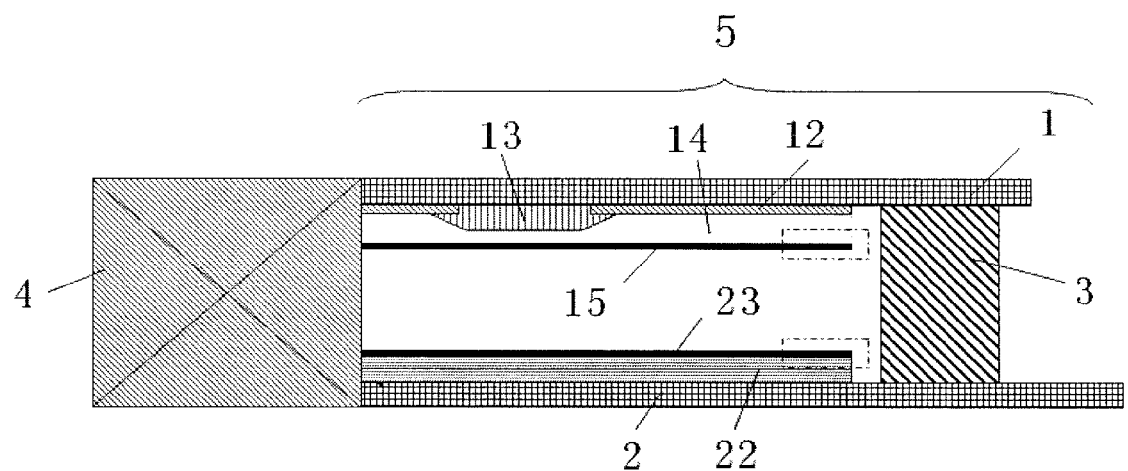
FIG. 1 is a structurally schematic view showing a liquid crystal display panel in prior art.
Figure 2:
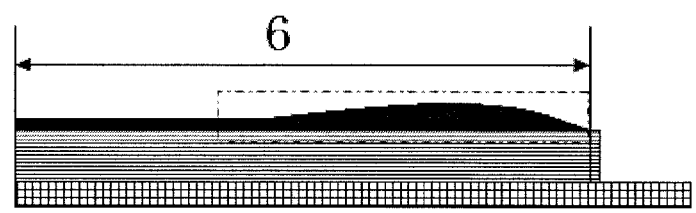
FIG. 2 is a partially enlarged schematic view of FIG. 1.
Figure 3:
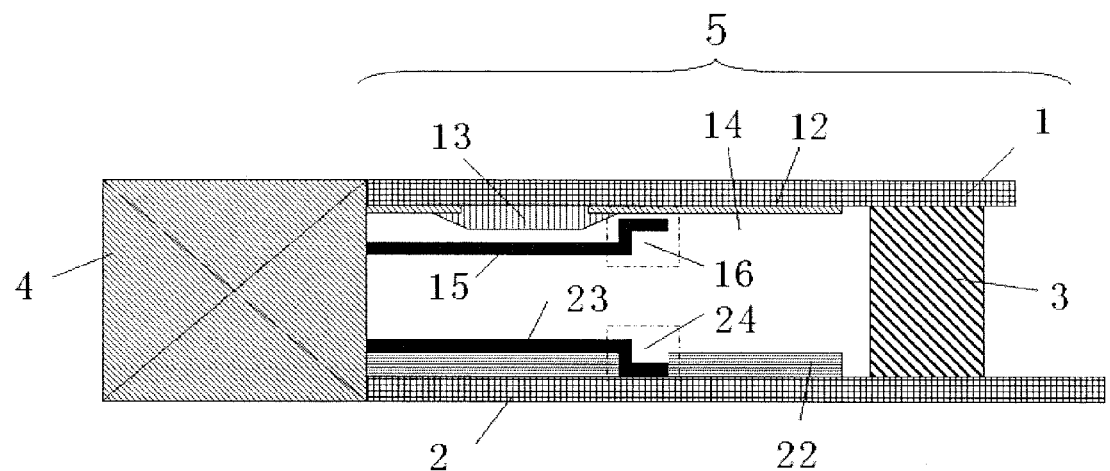
FIG. 3 is a structurally schematic view showing a liquid crystal display panel in a first embodiment according to the present disclosure.

FIG. 3 is a schematic view illustrating a liquid crystal display panel in the embodiment, in which the structure of a peripheral area in the liquid crystal display panel is mainly illustrated. The liquid crystal display panel includes a first liquid-crystal-display substrate and a second liquid-crystal-display substrate that are cell-assembled to each other, with a liquid crystal layer interposed between the two liquid-crystal-display substrates. For example, the first liquid-crystal-display substrate may be a color filter substrate, and the second liquid-crystal-display substrate may be an array substrate. The liquid crystal display panel includes an effective display area 4 and a peripheral area 5 surrounding the effective display area 4. The effective display area 4 is an area for performance of image display, while the peripheral area 5 is not used to display images. The design emphasis of the present disclosure lies in the design of the peripheral area 5, so the effective display area 4 is illustrated in the figure merely in a simple way, and the detailed structure of the effective display area 4 is not shown. However, it is possible that the effective display area 4 of the liquid crystal panel according to the present disclosure adopts any suitable structure and includes any suitable functional layer(s).

In the peripheral area 5, it is possible that the color filter substrate and the array substrate only contain a part of functional layers in the effective display area 4. As shown in FIG. 3, in the peripheral area 5, a first base substrate 1 and a black matrix 12, a color filter layer 13 and a flat protective layer 14 that are disposed on the first base substrate 1 are included in the color filter substrate; and, a second base substrate 2 and a first insulating layer and a second insulating layer (collectively called as an insulating layer 22) that are disposed on the second base substrate 2 are included in the array substrate. Furthermore, on inner sides of the color filter substrate and the array substrate (the sides where they face each other), there are provided liquid crystal aligning layers 15 and 23, respectively. That is, the first liquid crystal aligning layer 15 is provided on the flat protective layer 14 of the color filter substrate, and the second liquid crystal aligning layer 23 is provided on the insulating layer 22 of the array substrate. In a gap between edges of the color filter substrate and the array substrate, in order that a liquid crystal material is fixed and sealed in the liquid crystal panel, it is also necessary that a sealant 3 be coated in the peripheral area 5 of the liquid crystal display panel and solidified.

As shown in FIG. 3, in the color filter substrate, in a place in the flat protective layer 14, which is close to its edge, there is provided a first recess 16, and one end of the first liquid crystal aligning layer 15 terminates within the first recess 16 (namely, an edge of the first liquid crystal aligning layer 15 is located within the first recess 16); and moreover, for the array substrate, in a place in the insulating layer 22 which is close to its edge, there is provided a second recess 23, and one end of the second liquid crystal aligning layer 23 terminates within the second recess 24 (namely, an edge of the second liquid crystal aligning layer 23 is located within the first recess 24). For example, the first recess 16 and the second recess 23 may extend along edges of the first base substrate 1 and the second base substrate 2, respectively. For example, in the case where the first base substrate 1 and the second base substrate 2 each are in a rectangular shape, as seen from a plane view, the first recess 16 and the second recess 23 each may also be formed into the shape of a closed rectangle. However, the shape of the first base substrate 1 and the second base substrate 2 is not limited to the rectangular shape, but can be any suitable shape.

In the embodiment, the first recess 16 and the second recess 24 are equal in length and width, and are aligned in a direction perpendicular to the color filter substrate or the array substrate.

In one example, the distance between one side of the first recess 16 which is close to the effective display area 4 and the effective display area 4 is smaller than or equal to 2 mm, and the distance between one side of the second recess 16 which is close to the effective display area 4 and the effective display area 4 is smaller than or equal to 2 mm. The location of the first recess 16 and the second recess 24 determines a minimized size for design of the periphery of the liquid crystal display panel. Because the surface tension of a polyimide liquid for manufacturing the liquid crystal aligning layers can be released by the first recess 16 and the second recess 24, a portion of a liquid crystal aligning layer that is close to its edge and except the recess 16 or 24 can also have a relatively uniform thickness. Thus, an edge of the liquid crystal aligning layer 15 or 23 can be closer to the effective display area 4 and this will not affect the display effect of the effective display area 4. In contrast to a case in prior art where the distance from an edge of a liquid crystal aligning layer to an effective display area 4 is 4.5 mm, the distance from an edge of a liquid crystal aligning layer to the effective display area 4 is smaller than or equal to 3.5 mm, so that a minimized size for design of the periphery of the liquid crystal display panel is further decreased.

Figure 4:
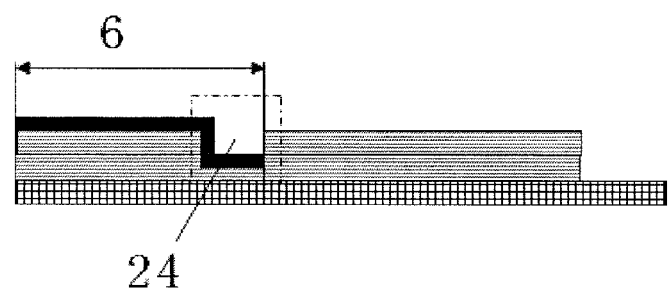
FIG. 4 is a partially enlarged structural schematic view of FIG. 3.

FIG. 4 is a partially enlarged schematic view of FIG. 3. The structure in a dashed-line frame in FIG. 4 corresponds to the structure in a dashed-line frame in FIG. 3. The structure of the second recess 24 is illustrated in FIG. 4 in a relatively clear way, and for the array substrate, the second recess 24 is provided in a place in the insulating layer 22 which is close to its edge.

In the embodiment, width of the second recess 24 is in the range of 1 mm-1.5 mm, its depth is in the range of 6000 Å-8000 Å; and the first recess 16 has the same width and depth as the second recess 24. The normal thicknesses of the first liquid crystal aligning layer disposed on the color filter substrate and the second liquid crystal aligning layer disposed on the array substrate are in the range of 800 Å-1000 Å, and the thicknesses of the first liquid crystal aligning layer and the second liquid crystal aligning layer within the first recess and the second recess are in the range of 3000 Å-4000 Å. Specifically, thickness of the first liquid crystal aligning layer on the flat protective layer 14 is in the range of 800 Å-1000 Å; and thickness of the second liquid crystal aligning layer on the insulating layer 22 is in the range of 800 Å-1000 Å. Further, preferably, thickness of the first liquid crystal aligning layer with the first recess is in the range of 3000 Å-4000 Å; and thickness of the second liquid crystal aligning layer within the second recess is in the range of 3000 Å-4000 Å.

In the embodiment, glass is usually used as material for the first base substrate 1 and the second base substrate 2, polyimide is usually used as material for the first liquid crystal aligning layer 15 and the second liquid crystal aligning layer 23, and silicon nitride is usually used as material for the insulating layer 22. Any suitable sealer can be used as the sealant 3, which serves the function of adjoining the first substrate 1 and the second substrate 2 to each other and sealing, such as sticking them together. Materials for the black matrix 12, the color filter layer 13 and the flat protective layer 14 are resin materials. The flat protective layer 14 has two functions: the first is to serve as a flat protective layer, and the second is to planarize a surface of a color filter.

In the embodiment, there is further provided a liquid crystal display device which comprises the above liquid crystal display panel.

In the embodiment, with the use of characteristics of the liquid that it has surface tension and possesses a certain viscosity, in the peripheral area of the liquid crystal display panel, recesses are provided in peripheral regions of the liquid crystal aligning layers for the color filter substrate and the array substrate, so that polyimide liquids for manufacturing the liquid crystal aligning layers terminate within the recesses. The surface tension is released by the recesses, and such a shortcoming that the peripheral area is uneven owing to the influence of surface tension and viscosity during free diffusion of the polyimide liquids in the liquid crystal aligning layers is effectively reduced (or even eliminated). Thus, the extent of uneven thickness of the liquid crystal aligning layers in the peripheral area can be reduced, and thereby minimization of design size for the periphery of the liquid crystal display panel is realized.

Second Embodiment

Figure 5:
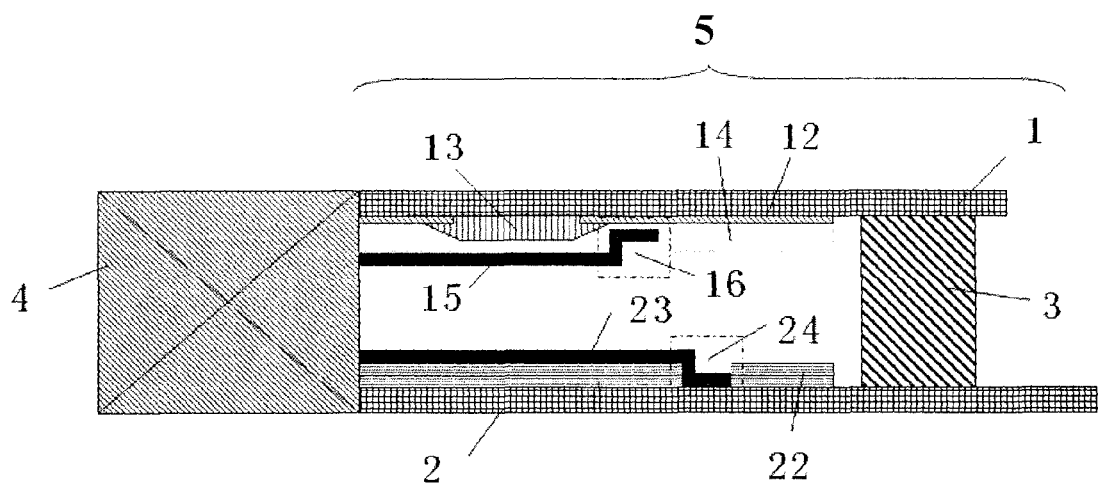
FIG. 5 is a structurally schematic view showing a liquid crystal display panel in a second embodiment according to the present disclosure.

The present embodiment differs from the First Embodiment in that, according to setting requirements of various functional layers in design of a liquid crystal panel, in order to avoid positional confliction between liquid crystal aligning layers and the functional layers in the liquid crystal panel, a first recess 16 provided in a color filter substrate and a second recess 24 provided in an array substrate in the embodiment may be mutually staggered in a direction perpendicular to the color filter substrate or the array substrate, and the first recess and the second recess may not be equal in length and width, as shown in FIG. 5.

Specifically, the liquid crystal display panel includes an effective display area and a peripheral area, the distance between one side of the first recess which is close to the effective display area and the effective display area is 2 mm, and the distance between one side of the second recess which is close to the effective display area and the effective display area is 2 mm.

Other structures of the liquid crystal display panel in the embodiment are the same as structures in the First Embodiment, details being omitted here.

In the embodiment, there is further provided a liquid crystal display device which comprises the above liquid crystal display panel.

Further, as regards liquid crystal display substrates provided by the present disclosure, such as a color filter substrate and an array substrate, they may refer to the color filter substrate and the array substrate mentioned in the liquid crystal display panel described in each of the First Embodiment and the Second Embodiment as stated above, and the liquid crystal display substrates will not be separately described here either.

In embodiments shown in FIGS. 3-5, there is merely illustrated a case where the sectional shape of the first recess 16 and the second recess 24 is a rectangle, but the present disclosure is not limited thereto. For example, the sectional shape of the recess 16 or 24 may be a half-circle, a triangle or any suitable shape.

The descriptions made above are merely exemplary embodiments of the invention, but are not used to limit the protection scope of the invention. The protection scope of the invention is determined by attached claims.

What is claimed is:

1. A liquid crystal display substrate, comprising:
a base substrate;
a planarizing layer disposed on the base substrate; and
a liquid crystal aligning layer disposed on the planarizing layer,
wherein the planarizing layer is provided with a recess therein at a place close to its edge, the recess contains sidewalls that are opposite to each other and a bottom, the sidewalls are formed by the planarizing layer, and
wherein the liquid crystal aligning layer terminates within the recess and terminates at a sidewall of the recess that is closest to an edge of the base substrate.

2. The liquid crystal display substrate according to claim 1, wherein the liquid crystal display substrate comprises an effective display area and a peripheral area surrounding the effective display area, and the distance between one side of the recess close to the effective display area and the effective display area is smaller than or equal to 2 mm.

3. The liquid crystal display substrate according to claim 1, wherein the recess extends along the edge of the base substrate.

4. The liquid crystal display substrate according to claim 1, wherein a thickness of a portion of the liquid crystal aligning layer within the recess is larger than a thickness of other portion of the liquid crystal aligning layer.

5. The liquid crystal display substrate according to claim 1, wherein the recess has a depth in the range of 6000 Å-8000 Å, and a width in the range of 1 mm-1.5 mm.

6. The liquid crystal display substrate according to claim 1, wherein a thickness of the liquid crystal aligning layer within the recess is in the range of 3000 Å-4000 Å.

7. The liquid crystal display substrate according to claim 1, wherein the liquid crystal display substrate is a color filter substrate, and the color filter substrate further comprises a black matrix and a color filter layer that are disposed between the planarizing layer and the substrate.

8. The liquid crystal display substrate according to claim 1, wherein the liquid crystal display substrate is an array substrate, and the array substrate further comprises a thin film transistor (TFT) switch element and an electrode line and a scan line corresponding to it, which are disposed between the planarizing layer and the substrate.

9. A liquid crystal display panel, comprising a first substrate and a second substrate that are cell-assembled to each other and a liquid crystal layer provided between the first substrate and the second substrate, wherein each of the first substrate and the second substrate comprises:
a base substrate;
a planarizing layer disposed on the base substrate; and
a liquid crystal aligning layer disposed on the planarizing layer,
wherein the planarizing layer is provided with a recess therein at a place close to its edge, the recess contains sidewalls that are opposite to each other and a bottom, the sidewalls are formed by the planarizing layer, and
wherein the liquid crystal aligning layer terminates within the recess and terminates at a sidewall of the recess that is closest to an edge of the base substrate.

10. The liquid crystal display panel according to claim 9, wherein the liquid crystal display panel comprises an effective display area and a peripheral area surrounding the effective display area, and the distance between one side of the recess close to the effective display area and the effective display area is smaller than or equal to 2 mm.

11. The liquid crystal display panel according to claim 9, wherein the recess extends along the edge of the base substrate.

12. The liquid crystal display panel according to claim 9, wherein a thickness of a portion of the liquid crystal aligning layer within the recess is larger than a thickness of other portion of the liquid crystal aligning layer.

13. The liquid crystal display panel according to claim 9, wherein the recess has a depth in the range of 6000 Å-8000 Å, and a width in the range of 1 mm-1.5 mm.

14. The liquid crystal display panel according to claim 9, wherein a thickness of the liquid crystal aligning layer within the recess is in the range of 3000 Å-4000 Å.

15. The liquid crystal display panel according to claim 9, wherein the first substrate is a color filter substrate, and the color filter substrate further comprises a black matrix and a color filter layer that are disposed between the plana zing layer and the substrate.

16. The liquid crystal display panel according to claim 9, wherein the second substrate is an array substrate, and the array substrate further comprises a thin film transistor (TFT) switch element and an electrode line and a scan line corresponding to it, which are disposed between the planarizing layer and the substrate.

17. A liquid crystal display device comprising a liquid crystal display panel, the liquid crystal display panel including a first substrate and a second substrate that are cell-assembled to each other and a liquid crystal layer that is provided between the first substrate and the second substrate, wherein each of the first substrate and the second substrate comprises:
a base substrate;
a planarizing layer disposed on the base substrate; and
a liquid crystal aligning layer disposed on the planarizing layer, wherein the planarizing layer is provided with a recess therein at a place close to its edge, the recess contains sidewalls that are opposite to each other and a bottom, the sidewalls are formed by the planarizing layer, and wherein the liquid crystal aligning layer terminates within the recess and terminates at a sidewall of the recess that is closest to an edge of the base substrate.

* * * * *